Aug. 29, 1961 M. T. MAY 2,998,497

HEAD SUPPORT FOR A TELEPHONE HANDSET

Filed April 29, 1960

INVENTOR.

MARTHA T. MAY

BY

McMorrow, Berman & Davidson

ATTORNEYS

United States Patent Office 2,998,497

Patented Aug. 29, 1961

2,998,497

HEAD SUPPORT FOR A TELEPHONE HANDSET

Martha T. May, 1609 S. Hawthorne Road, Winston-Salem, N.C.

Filed Apr. 29, 1960, Ser. No. 25,597

4 Claims. (Cl. 179—156)

The present invention relates to telephone handsets generally and in particular to a head support for a handset.

It is frequently desirable for a person to be enabled to use a telephone while the person is busy at a task requiring the use of the hands. For instance, in a household, a housekeeper might be occupied at such a task as applying frosting to a cake when the telephone rings and requires answering. To leave the cake frosting unattended for more than a few second invites spoiling of the frosting by premature setting or hardening of the frosting, and often the ringing of the telephone may not be conveniently overlooked in order to continue with the task of applying the frosting to the cake. Other innumerable instances may be recited setting forth the desirability of having a means for supporting a telephone handset without the use of the hands of the telephone user.

An object of the present invention is to provide a head support for a telephone handset which is simple in structure, one comfortable when worn upon the head of a telephone user, one which supports a telephone handset without the use of the user's hands, and one which is economically feasible.

Another object of the present invention is to provide a head support for a telephone handset which positions the receiver of the handset adjacent one ear of the telephone user, positions the transmitter of the handset adjacent the mouth of the telephone user, and one which serves to maintain such positions of the receiver and transmitter during all movements of the telephone user or movements of the telephone user's head.

These and other objects and advantages of the present invention will be fully apparent from the following description when taken in conjunction with the annexed drawing, in which.

Figures 1, 2, 3:
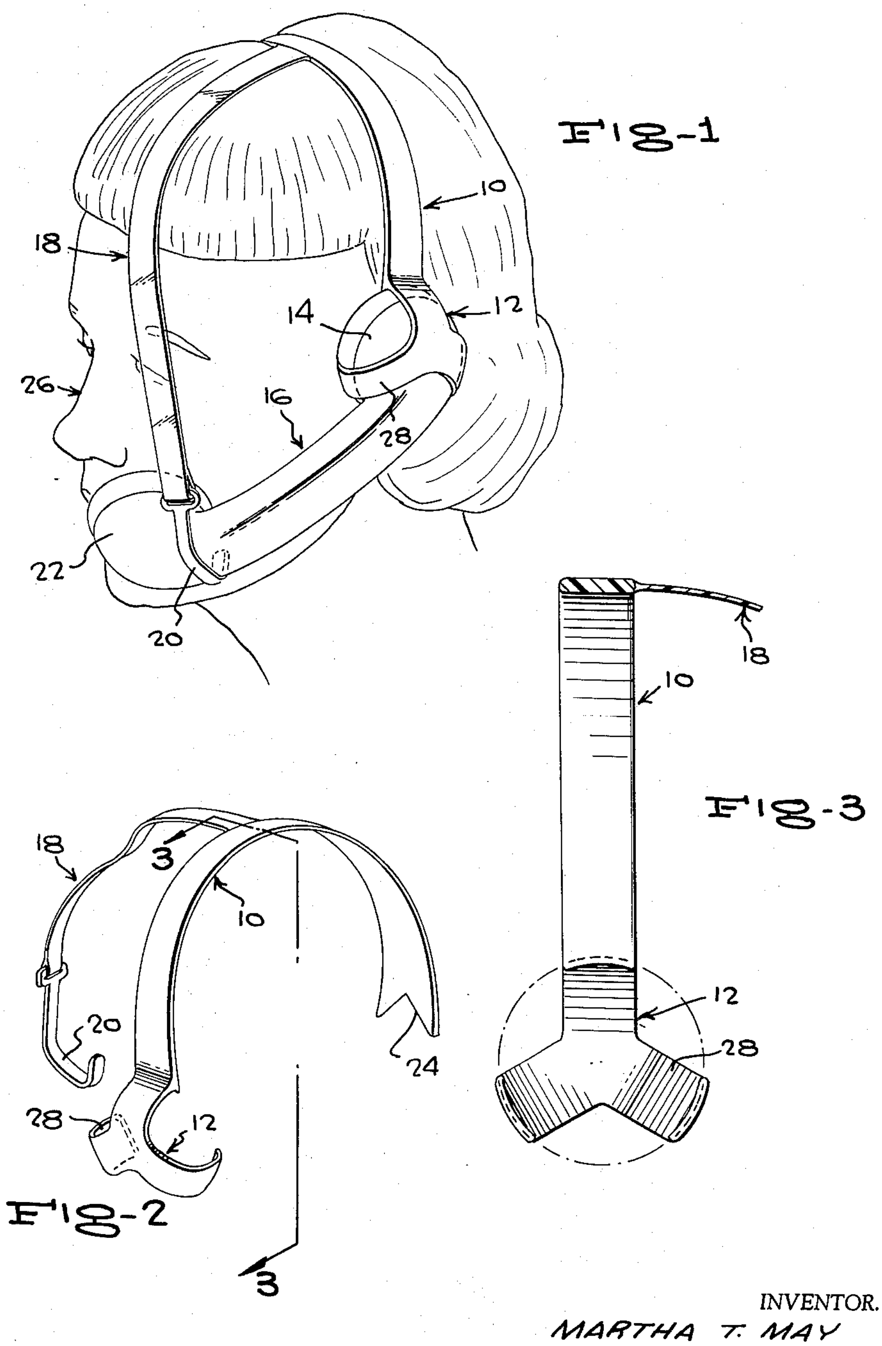
FIGURE 1 is an isometric view of the head of a human with the telephone handset head support worn by the human and supporting a telephone handset in a position of use.
FIGURE 2 is an isometric view of the support removed from the human head and without the telephone handset installed therein.
FIGURE 3 is a view on an enlarged scale, taken on the line 3—3 of FIGURE 2.

Referring in greater detail to the drawing in which like numerals indicate like parts throughout the several views, the head support of the present invention comprises a resilient head-engaging member 10 having means embodying a three pronged cup-shaped element 12 on one end for releasably embracing the receiver 14 of the telephone handset 16.

A flexible strap 18 has one end fixedly secured to the member 10 intermediate the ends of the latter and has means embodying a hook 20 on the other end adapted to engage the portion of the handset 16 adjacent the transmitter 22 of the handset 16.

The end of the head-engaging member 10 remote from the cup-shaped element 12 is provided with a notch 24 which receives the upper end portion of the ear of a human when the member 10 extends transversely over the head of the human with the ends of the member 10 adjacent the ears of the human, as in FIGURE 1, the human being designated by the numeral 26.

Preferably, the member 10 and strap 18 may be fabricated of aluminum, or other lightweight metal, plastic or the like.

The hook 20 is preferably fabricated of a resilient semirigid material so that it snaps around the portion of the handset 16 adjacent the transmitter 22. Similarly, the fingers 28 of the cup-shaped element 12 are preferably fabricated of resilient material so as to embracingly but detachably receive the receiver 14 therebetween.

In use, the support of the present invention may be attached to the telephone handset 16 with ease and facility and it may remain attached to the handset either permanently or for such periods as it might be useful in supporting the telephone handset on the head of the user while the user's hands are occupied at one or another task. The support is easily placed on the head of the wearer with the cup-shaped element 12 adjacent one ear and with the notch 24 receiving the upper end portion of the other ear, and with the strap 18 extending at least partially over the cheek and forehead of the head, so as to position the transmitter 22 adjacent the mouth.

What is claimed is:

1. A device for supporting a telephone handset including a receiver and a transmitter on the head of a human comprising a resilient head-engaging member adapted to be disposed so as to extend transversely over the head of a human with the ends thereof adjacent the ears of the human, means on one end of said member adapted to releasably embrace the receiver of a telephone handset, a flexible strap having one end fixedly secured to said member intermediate the ends thereof, and means on the other end of said strap adapted to engage the portion of said handset adjacent the transmitter when the receiver is supported in said embracing means.

2. A device for supporting a telephone handset including a receiver and a transmitter on the head of a human comprising a resilient head-engaging member adapted to be disposed so as to extend transversely over the head of a human with the ends thereof adjacent the ears of the human, means embodying a three pronged cup-shaped element on one end of said member adapted to releasably embrace the receiver of a telephone handset, a flexible strap having one end fixedly secured to said member intermediate the ends thereof, and means on the other end of said strap adapted to engage the portion of said handset adjacent the transmitter when the receiver is supported in said embracing means.

3. A device for supporting a telephone handset including a receiver and a transmitter on the head of a human comprising a resilient head-engaging member adapted to be disposed so as to extend transversely over the head of a human with the ends thereof adjacent the ears of the human, means on one end of said member adapted to releasably embrace the receiver of a telephone handset, a flexible strap having one end fixedly secured to said member intermediate the ends thereof, and means embodying a hook on the other end of said strap adapted to engage the portion of said handset adjacent the transmitter when the receiver is supported in said embracing means.

4. A device for supporting a telephone handset including a receiver and a transmitter on the head of a human comprising a resilient head-engaging member adapted to be disposed so as to extend transversely over the head of a human with the ends thereof adjacent the ears of the human, means embodying a three pronged cup-shaped element on one end of said member adapted to releasably embrace the receiver of a telephone handset, a flexible strap having one end fixedly secured to said member intermediate the ends thereof, and means embodying a hook on the other end of said strap adapted to engage the portion of said handset adjacent the transmitter when the receiver is supported in said embracing means.

No references cited.